United States Patent
Ando (10) Patent No.: US 8,238,858 B2
(45) Date of Patent: Aug. 7, 2012

(54) COMMUNICATION DEVICE, MULTI-BAND RECEIVER, AND RECEIVER

(75) Inventor: Yoshiaki Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 1427 days.

(21) Appl. No.: 11/813,655

(22) PCT Filed: Jan. 11, 2006

(86) PCT No.: PCT/JP2006/300230
§ 371 (c)(1), (2), (4) Date: Jul. 10, 2007

(87) PCT Pub. No.: WO2006/075631
PCT Pub. Date: Jul. 20, 2006

(65) Prior Publication Data
US 2009/0022246 A1    Jan. 22, 2009

(30) Foreign Application Priority Data
Jan. 14, 2005 (JP) .................................. 2005-008309

(51) Int. Cl.
*H04B 1/18* (2006.01)

(52) U.S. Cl. ............... 455/188.1; 455/168.1; 455/176.1; 370/281; 370/295; 370/480

(58) Field of Classification Search ................ 455/188.1
See application file for complete search history.

(56) References Cited

U.S. PATENT DOCUMENTS

| | | | |
|---|---|---|---|
| 6,310,863 B1 * | 10/2001 | Yamamoto | 370/281 |
| 2004/0146116 A1 * | 7/2004 | Kang et al. | 375/260 |
| 2005/0093608 A1 * | 5/2005 | Ohtani et al. | 327/310 |

* cited by examiner

*Primary Examiner* — Duc Nguyen
*Assistant Examiner* — Ajibola Akinyemi
(74) *Attorney, Agent, or Firm* — Sughrue Mion, PLLC (57) ABSTRACT

In a direct-conversion type orthogonal demodulator used in a multi-band receiver, influence to signal-receiving characteristics of the receiver, caused by DC offset drift produced when a band is switched to another, is reduced. In a multi-band receiver including a plurality of orthogonal demodulators each carrying out orthogonal demodulation for each of a plurality of band inputs, a switch which selects one of outputs transmitted from the orthogonal demodulators in accordance with a band-switching control signal, and a high pass filter receiving an output transmitted from the switch, a cut-off frequency of the high pass filter is raised when a band is switched to another, to thereby shorten a convergent time of DC offset drift included in an output signal.

23 Claims, 10 Drawing Sheets

COMMUNICATION DEVICE, MULTI-BAND RECEIVER, AND RECEIVER

BACKGROUND OF THE INVENTION

1. Field of the Invention

The invention relates to a communication device, a multi-band receiver, and a receiver.

2. Description of the Related Art

In order to reduce DC (direct current) offset in an AGC (Automatic Gain Control) circuit equipped in a CDMA (Code Division Multiple Access) receiver, for instance, Japanese Patent Application Publication No. 2003-224488 (patent reference 1) has suggested detecting a period of time in which DC offset in an internal circuit equipped in a direct-conversion type receiver may increase beyond a threshold due to AGC operation, and setting a cut-off frequency of a high pass filter equipped in a base-band variable gain-amplifying circuit, to be higher than a normal frequency in the detected period of time to thereby swiftly converge transient response of signals having passed the high pass filter.

Recently, a user equipment (UE) such as a mobile phone covering a plurality of frequency bands different from one another (for instance, 2 GHz band and 800 MHz band) is being developed.

When inter-frequency handover is to be carried out between different carrier frequencies, it is necessary for a user equipment (UE) to establish synchronization after switching a frequency to another. To this end, a user equipment (UE) is designed to carry out predetermined measurement relating to a carrier frequency which the user equipment would have after handover was carried out, during a period (called "transmission gap") of time in which a part of frame of active link is ceased to be transmitted, and transfer data included in deleted period of time (that is, data in transmission gap) at a high rate during active period of time, to thereby raise transmission power. Thus, it is possible to maintain a transmission rate and channel quality. Such a control as mentioned above is called "compressed mode" (3GPP Compressed Mode) (for instance, see the non-patent references 1, 2 and 3).

When handover is necessary to be carried out, a base station (BTS) instructs a user equipment (UE) to operate in a compressed mode. A compressed mode is carried out by reducing a dispersion rate, and by deleting bits out of data (that is, puncturing, but only for downlink).

A compressed frame is defined periodically or on request. A compressed frame has variable rate and type, both of which are dependent on environment and requirement for measurement.

As a structure similar to a part of a later mentioned second embodiment in accordance with the present invention, Japanese Patent Application Publication No. 04-297182 (patent reference 2) has suggested an image reader in which two image signals transmitted from CCD (Charge Coupled Device) are amplified in AC amplifiers electrically connected to each other in AC manner through capacitors C1 and C2. Capacitors C3 and C4 are electrically connected at one of their ends to output ports of the AC amplifiers, and at the other ends to DC buffers. The capacitors C3 and C4 are electrically connected at the other ends thereof to each other in accordance with clamp signals.

Patent Reference 1: Japanese Patent Application Publication No. 2003-224488

Patent Reference 2: Japanese Patent Application Publication No. 04-297182

Non-patent Reference 1: 3GPP TS 25.215 V3.10.0 Technical Specification Group Radio Access Network; Physical layer—Measurements (FDD) (Release 1999)

Non-patent Reference 2: 3GPP TS 25.212 V3.11.0 Technical Specification Group Radio Access Network; Multiplexing and Channel Coding (FDD) (Release 1999)

Non-patent Reference 3: 3GPP TS 25.101 V3.17.0 Technical Specification Group Radio Access Network; User Equipment (UE) radio transmission and reception (FDD) (Release 1999)

SUMMARY OF THE INVENTION

A multi-band receiver capable of covering a plurality of frequency bands is designed to include a plurality of orthogonal demodulators in association with a plurality of frequency bands. When a frequency band is switched to another, a signal is input into a base-band variable gain-amplifying circuit (for instance, comprised of a high pass filter (HPF) disposed downstream of an orthogonal demodulator and a switch, an AGC amplifier, a high pass filter, and an AGC amplifier) through a switch.

If DC offsets do not match to one another among a plurality of orthogonal demodulators, there would be caused a following problem when a band is switched to another.

That is, if there is caused DC offset drift (defined as drift caused when DC offsets do not match to one another among a plurality of orthogonal demodulators) when a band is switched to another, though it is dependent on a cut-off frequency of a high pass filter, there would be caused an AGC level error in a certain period of time immediately after a frequency band has been switched to another, or there would be caused a lack in pilot data, resulting in degradation in performance of receiving signals.

For instance, assuming that a gain in a base-band variable gain-amplifying circuit is about 40 dB, DC offset drift caused immediately after a frequency band has been switched to another would be 100 times amplified in voltage (for instance, 10 mV of DC offset drift is amplified to 1V), resulting in AGC level error and/or an increase in data error (for instance, a bit error rate (BER) (for instance, assuming that a gain in a base-band variable gain-amplifying circuit is 60 dB, 1 mV of DC offset drift is amplified to 1V).

Furthermore, if it is delayed to converge DC offset drift immediately after a frequency band has been switched to another, the measurement would not be correctly carried out during a transmission gap, resulting in unexpected error during carrying out handover in a compressed mode.

In view of the above-mentioned problems in the conventional receivers, it is an object of the present invention to provide a receiver and a communication device including the receiver, both of which are capable of reducing influence on signal-receiving performance, caused by DC offset drift generated when a frequency band is switched to another, in a direct-conversion type orthogonal demodulator equipped in a multi-band receiver.

In order to solve the above-mentioned problems, there is provided a communication device including a plurality of orthogonal demodulators each covering each of a plurality of frequency bands, wherein predetermined measurement is carried out in a transmission gap in which a part of a frame in one of the frequency bands is ceased to be transmitted, for the other among the frequency bands, and data in the transmission gap is transmitted, and a convergent-time shortening unit for, when the one of the frequency bands is switched to the other among the frequency bands, shortening a convergent time of DC offset drift caused by switching one of the orthogonal demodulators to the other.

In the communication device in accordance with the present invention, the convergent-time shortening unit may be designed to shorten the convergent time by raising a cut-off frequency of a high pass filter which receives an output transmitted from an orthogonal demodulator associated with the other among the frequency bands, when the one of the frequency bands is switched to the other among the frequency bands.

The communication device in accordance with the present invention is comprised of a communication device operating in a so-called compressed mode.

In the communication device in accordance with the present invention, it is preferable that the convergent-time shortening unit varies the cut-off frequency of the high pass filter within a variable range.

The communication device in accordance with the present invention may be designed to further include a DC short-circuit unit for, when the one of the frequency bands is switched to the other among the frequency bands, DC short-circuiting an output transmitted from an orthogonal demodulator associated with the one of the frequency bands and an output transmitted from an orthogonal demodulator associated with the other among the frequency bands to each other for a predetermined period of time.

There is further provided a communication device including a plurality of orthogonal demodulators each covering each of a plurality of frequency bands, wherein predetermined measurement is carried out in a transmission gap in which a part of a frame in one of the frequency bands is ceased to be transmitted, for the other among the frequency bands, and data in the transmission gap is transmitted, and a DC short-circuit unit for, when the one of the frequency bands is switched to the other among the frequency bands, DC short-circuiting an output transmitted from an orthogonal demodulator associated with the one of the frequency bands and an output transmitted from an orthogonal demodulator associated with the other among the frequency bands to each other for a predetermined period of time.

In the communication device in accordance with the present invention, it is preferable that the other among the frequency bands is a frequency band selected after handover is carried out when handover is to be carried out between different carrier frequencies.

The communication device in accordance with the present invention may be comprised of a mobile communication device.

There is further provided a multi-band receiver including a plurality of orthogonal demodulators each carrying out orthogonal demodulation for each of a plurality of band inputs, a switch which is electrically connected to outputs of the orthogonal demodulators, and selects one of outputs transmitted from the orthogonal demodulators in accordance with a band-switching control signal, a high pass filter receiving an output transmitted from the switch; and a variable gain-amplifying circuit disposed downstream of the high pass filter, and a convergent-time shortening unit for, when a band is switched to another, shortening a convergent time of DC offset drift caused by switching one of the orthogonal demodulators to the other.

In the multi-band receiver in accordance with the present invention, the convergent-time shortening unit may be designed to shorten the convergent time by raising a cut-off frequency of the high pass filter when a band is switched to another.

In the multi-band receiver in accordance with the present invention, it is preferable that the convergent-time shortening unit produces the band-switching control signal in accordance with externally provided data relating to a frequency, and simultaneously produces a cut-off frequency control signal in accordance with which a cut-off frequency of the high pass filter is controlled, to thereby control a cut-off frequency of the high pass filter.

In the multi-band receiver in accordance with the present invention, the convergent-time shortening unit may be designed to vary the cut-off frequency of the high pass filter within a variable range.

The multi-band receiver in accordance with the present invention may be designed to further include a DC short-circuit circuit for, when a band is switched to another, DC short-circuiting an output transmitted from the previous orthogonal demodulator and an output transmitted from a newly selected orthogonal demodulator to each other for a predetermined period of time.

There is further provided a multi-band receiver including a plurality of orthogonal demodulators each carrying out orthogonal demodulation for each of a plurality of band inputs, a switch which is electrically connected to outputs of the orthogonal demodulators, and selects one of outputs transmitted from the orthogonal demodulators in accordance with a band-switching control signal, a high pass filter receiving an output transmitted from the switch, a variable gain-amplifying circuit disposed downstream of the high pass filter, and a DC short-circuit circuit for, when a band is switched to another, DC short-circuiting an output transmitted from the previous orthogonal demodulator and an output transmitted from a newly selected orthogonal demodulator to each other for a predetermined period of time.

There is further provided a receiver including a plurality of orthogonal demodulators, a switch which is electrically connected to outputs of the orthogonal demodulators, and selects one of outputs transmitted from the orthogonal demodulators in accordance with a band-switching control signal, a high pass filter receiving an output transmitted from the switch, a variable gain-amplifying circuit disposed downstream of the high pass filter, a convergent-time shortening unit for, when a band is switched to another, shortening a convergent time of DC offset drift caused by switching one of the orthogonal demodulators to the other.

In the receiver in accordance with the present invention, the convergent-time shortening unit may be designed to shorten the convergent time by raising a cut-off frequency of the high pass filter when a band is switched to another.

The receiver in accordance with the present invention may be designed to further include a DC short-circuit circuit for, when a band is switched to another, DC short-circuiting an output transmitted from the previous orthogonal demodulator and an output transmitted from a newly selected orthogonal demodulator to each other for a predetermined period of time.

There is further provided a receiver including a plurality of orthogonal demodulators, a switch which is electrically connected to outputs of the orthogonal demodulators, and selects one of outputs transmitted from the orthogonal demodulators in accordance with a band-switching control signal, a high pass filter receiving an output transmitted from the switch, a variable gain-amplifying circuit disposed downstream of the high pass filter, and a DC short-circuit circuit for, when a band is switched to another, DC short-circuiting an output transmitted from the previous orthogonal demodulator and an output transmitted from a newly selected orthogonal demodulator to each other for a predetermined period of time.

In accordance with the present invention, it is possible to reduce influence on signal-receiving performance, caused by DC offset drift, by shortening a convergent time of DC offset drift caused by switching an orthogonal demodulator to another, when a frequency band is switched to another.

Furthermore, by shortening a convergent time of DC offset drift caused by switching an orthogonal demodulator to another, it would be possible to sufficiently have a time for making predetermined measurement during a transmission gap, ensuring correctness in the measurement.

Furthermore, in accordance with the present invention, when a frequency band is switched to another frequency band, an output transmitted from an orthogonal demodulator associated with the frequency band and an output transmitted from an orthogonal demodulator associated with the another frequency bands are DC-short-circuited to each other for a predetermined period of time. Thus, it is possible to prevent generation of DC offset drift caused by switching an orthogonal demodulator to another, ensuring that signal-receiving performance would be less harmfully influenced by DC offset drift.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

First Exemplary Embodiment

In a multi-band receiver in accordance with the first exemplary embodiment of the present invention, a cut-off frequency of a high pass filter (HPS) is controlled after an input signal was converted into a base band signal, to thereby improve signal-receiving performance. The first exemplary embodiment in accordance with the present invention can be applied not only to a 2-band multi-band receiver, but also to a 3- or more band multi-band receiver.

Figure 1:
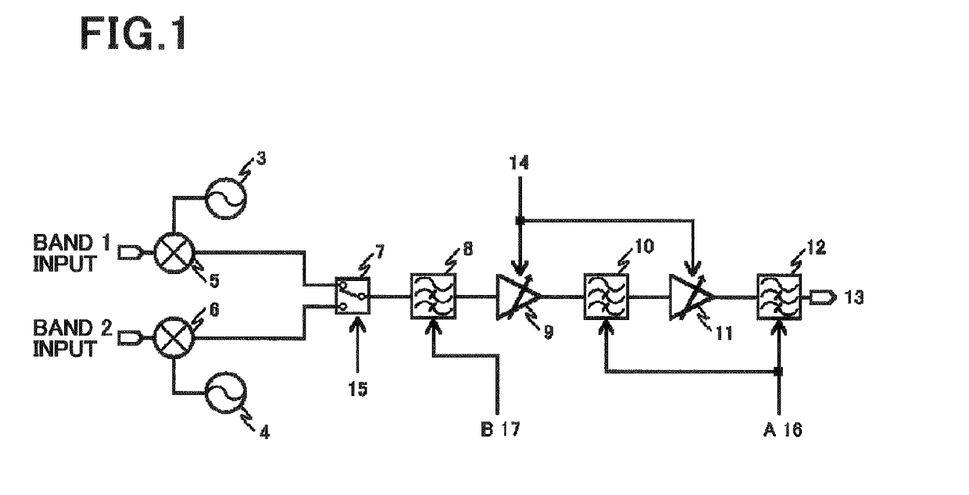
FIG. 1 is a block diagram of a multi-band receiver in accordance with the first exemplary embodiment of the present invention.

FIG. 1 is a block diagram of a multi-band receiver in accordance with the first exemplary embodiment of the present invention.

As illustrated in FIG. 1, a multi-band receiver in accordance with the first exemplary embodiment includes a BAND 1 orthogonal demodulator 5, a BAND 1 local signal oscillator 3, a BAND 2 orthogonal demodulator 6, a BAND 2 local signal oscillator 4, a switch 7, a first high pass filter (HPF) 8, a first AGC amplifier 9, a second high pass filter 10, a second AGC filter 11, and a third high pass filter 12.

The switch 7 receives a BAND-switching control signal 15. The first high pass filter 8 receives HPF cut-off frequency control signal B17. Each of the second high pass filter 10 and the third high pass filter 12 receives a HPF cut-off frequency control signal A16. An example of a signal-transmitter for transmitting the BAND-switching control signal 15, the HPF cut-off frequency control signal B17, and the HPF cut-off frequency control signal A16 is explained later with reference to FIG. 8.

A dual band receiver is illustrated in FIG. 1 only for the purpose of simplification of description. However, it should be noted that the first exemplary embodiment may be applied not only to a 2-band (dual band) receiver, but also to a N-band receiver, wherein N indicates an integer equal to or greater than three.

Furthermore, for simplification, an I (in-plane) signal and a Q (quadrature) signal both transmitted from an orthogonal demodulator are illustrated in a single signal line.

In the multi-band receiver in accordance with the first exemplary embodiment illustrated in FIG. 1, a convergent time of DC offset drift caused by not matching in DC level between the BAND 1 orthogonal demodulator 5 and the BAND 2 orthogonal demodulator 6 when a frequency band is switched to another is shortened by raising a cut-off frequency of the first high pass filter 8 in accordance with the HPF cut-off frequency control signal B17, ensuring reduction in harmful influence on signal-receiving performance of the multi-band receiver.

The BAND 1 orthogonal demodulator 5 orthogonally demodulates a signal received through a BAND 1 input in accordance with a local signal received from the BAND 1 local signal oscillator 3, to thereby convert the signal into a base band signal (I, Q).

The BAND 2 orthogonal demodulator 6 orthogonally demodulates a signal received through a BAND 2 input in accordance with a local signal received from the BAND 2 local signal oscillator 4, to thereby convert the signal into a base band signal (I, Q).

When a frequency band to be used in the multi-band receiver is determined, a signal indicative of the determined frequency band is transmitted from outside of the multi-band receiver to a control signal producing circuit (not illustrated in FIG. 1) equipped in the multi-band receiver. On receipt of the signal, the control signal producing circuit produces a BAND switching control signal 15 in accordance with a frequency band indicated in the signal. The BAND switching control signal 15 is transmitted to the switch 7.

In accordance with the received BAND switching control signal 15, the switch 7 selects one of an output transmitted from the BAND 1 orthogonal demodulator 5 and an output transmitted from the BAND 2 orthogonal demodulator 6, and allows the selected output indicating a frequency band to be used to pass therethrough.

An output transmitted from the BAND 1 orthogonal demodulator 5 or an output transmitted from the BAND 2 orthogonal demodulator 6, having passed through the switch 17, is input into the first high pass filter 8. The first high pass filter 8 allows only a high frequency part to pass therethrough.

Figure 2:
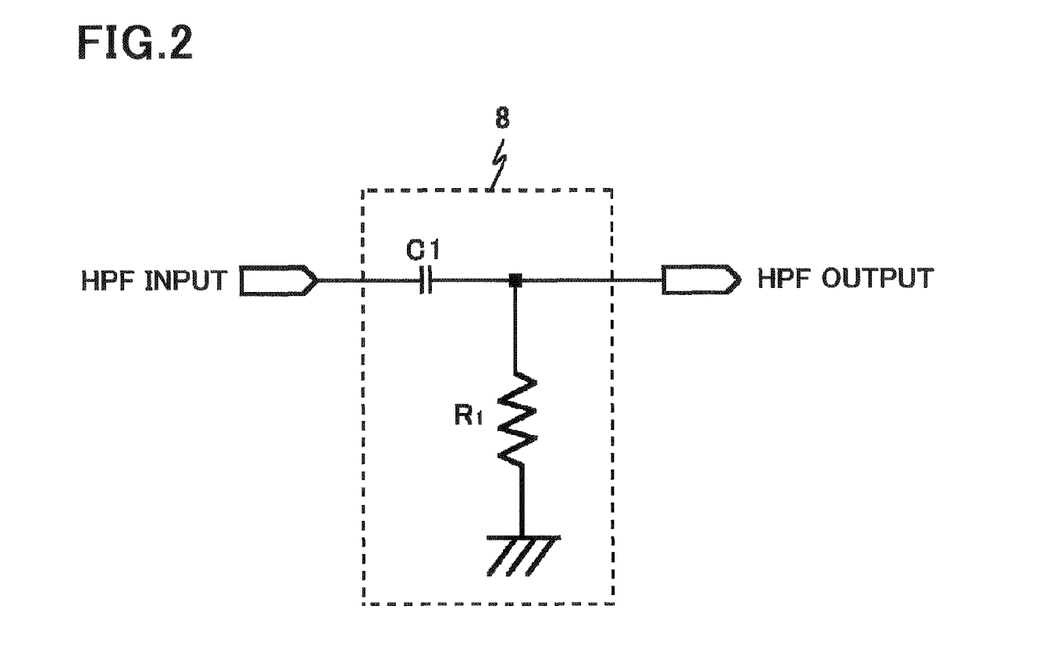
FIG. 2 is a circuit diagram of a circuit equivalent to the first high pass filter illustrated in FIG. 1.

FIG. 2 is a circuit diagram indicating a circuit equivalent to the first high pass filter 8.

As illustrated in FIG. 2, the first high pass filter 8 is equivalent to a circuit comprised of a capacitor having a capacity C1, and a resistor electrically connected at one end thereof to the capacitor and grounded at the other end, and having a resistance R1.

In view of the equivalent circuit (CR circuit) illustrated in FIG. 2, a cut-off frequency Fc and a time constant $\tau$ of the first high pass filter 8 are expressed as follows.

$$Fc=1/(2\pi C1 \times R1) \tag{1}$$

$$\tau = C1 \times R1 \tag{2}$$

The signal transmitted from the first high pass filter 8 is amplified in the first AGC amplifier 9, and then, input into the second high pass filter 10. The second high pass filter 10 allows only a high frequency part to pass therethrough.

The signal transmitted from the second high pass filter 10 is amplified in the second AGC amplifier 11, and then, input into the third high pass filter 12. The third high pass filter 12 allows only a high frequency part to pass therethrough.

Thus, an output transmitted from the BAND 1 orthogonal demodulator 5 or an output transmitted from the BAND 2 orthogonal demodulator 6 is output from the third high pass filter 12 as a base band signal, that is, I and Q signals 13.

When the first AGC amplifier 9 and the second AGC amplifier 11 amplify the signal, a gain of each of the first AGC amplifier 9 and the second AGC amplifier 11 is varied in accordance with an AGC control signal 14 such that the I and Q signals could have a desired output level.

Each of the second high pass filter 10 and the third high pass filter 12 raises a cut-off frequency in accordance with the HPF cut-off frequency control signal A16 to rapidly converge glitch noises in order to reduce harmful influence exerted on signal-receiving performance of the multi-band receiver by glitch noises generated when a gain of each of the first AGC amplifier 9 and the second AGC amplifier 11 rapidly varies.

In the multi-band receiver in accordance with the first exemplary embodiment illustrated in FIG. 1, when the switch 7 switches an output in accordance with the BAND switching control signal 15, for instance, the following DC offset drift $\Delta V$ is generated due to that DC offsets of the BAND 1 orthogonal demodulator 5 and the BAND 2 orthogonal demodulator 6 do not match each other.

$$\Delta V = V1 - V2 \tag{3}$$

In the equation (3), V1 indicates a DC voltage of the BAND 1 orthogonal demodulator 5, and V2 indicates a DC voltage of the BAND 2 orthogonal demodulator 6.

A convergent time of DC offset drift $\Delta V$ generated when a frequency band is switched to another is determined in dependence on a time constant of the first high pass filter 8.

In light of the equations (2) and (3), a convergent time of DC offset drift $\Delta V$ can be expressed with the following equation (4).

$$V_0 = \Delta V \times e^{(-t/\tau)}$$

$$\therefore t = -\tau \times \ln(V_0 / \Delta V) \tag{4}$$

In the equation (4), "$V_0$" indicates DC offset drift transmitted from the first high pass filter 8, "t" indicates a convergent time of DC offset drift, and "e" indicates a base of natural logarithm.

For simplification, ignoring influences exerted by the second high pass filter 10 and the third high pass filter 12, DC offset drift generated when a frequency band was switched to another is amplified to a degree equal to gains of the first AGC amplifier 9 and the second AGC amplifier 11, and then, is output as IQ output 13. That is, DC offset drift includes in the IQ output 13 varies in magnitude in accordance with gains of the first AGC amplifier 9 and the second AGC amplifier 11.

$$Viq = G \times V_0 = (G9 + G11) \times \Delta V \times e^{(-t/\tau)} \tag{9}$$

$$tiq = -\tau \times \ln(V_0 / \Delta V(G9 + G11)) \tag{10}$$

In the equations (9) and (10), "Viq" indicates DC offset drift generated in the IQ output 13, "tiq" indicates a convergent time of DC offset drift generated in the IQ output 13, "G9" indicates an amplification rate of the first AGC amplifier 9, and "G11" indicates an amplification rate of the second AGC amplifier 11.

Figure 3:
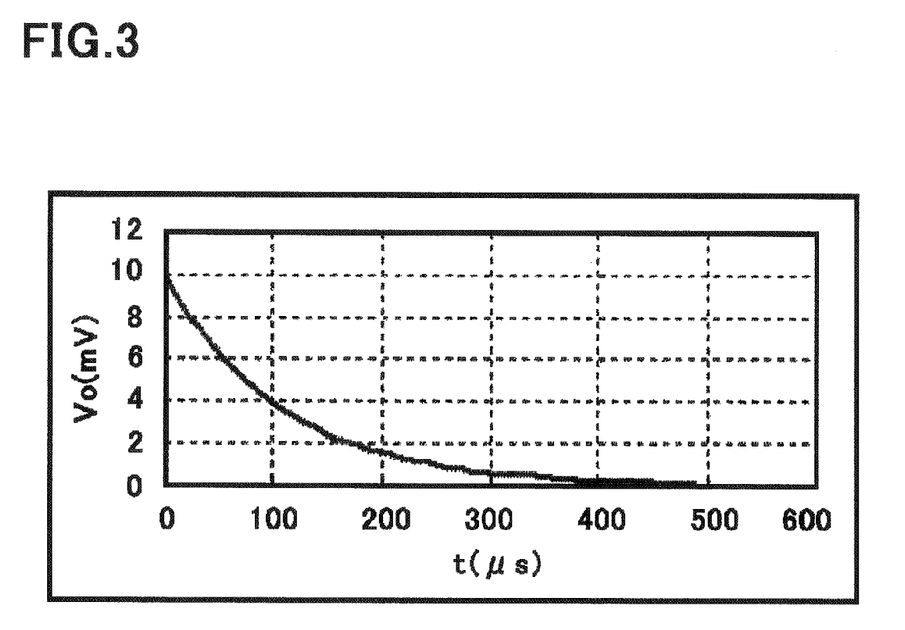
FIG. 3 shows a relation between a convergent time "t" and DC offset drift Vo output from the first high pass filter (Fc=1.5 KHz).
Figure 4:
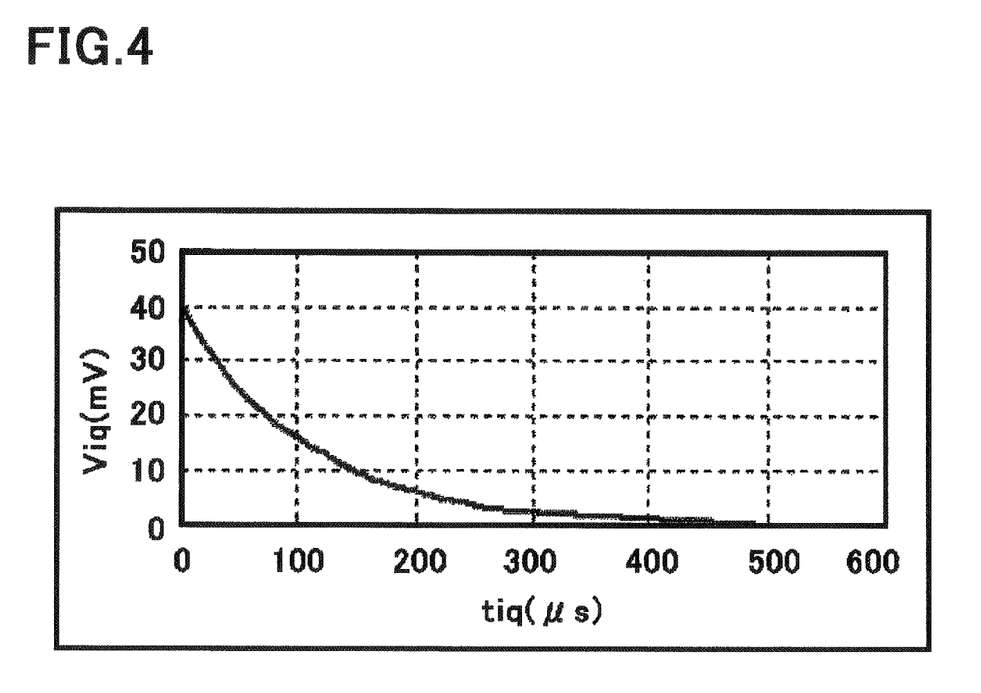
FIG. 4 shows a relation between a convergent time "tiq" of DC offset drift included in IQ output, and DC offset drift "Viq" included in IQ output (Fc=1.5 KHz).

As an example, a relation between "t" and "$V_0$" is illustrated in FIG. 3 in which $\Delta V$ is 10 mV, $\tau$ is 106 microseconds (cut-off frequency Fc=1.5 kHz), and G is 12 dB (=×4), and a relation between "tiq" and "Viq" in the same conditions is illustrated in FIG. 4.

There is generated DC offset drift due to switching a frequency band to another. In the multi-band receiver in accordance with the first exemplary embodiment, a HPF cut-off frequency control signal B17 is transmitted to the first high pass filter 8 at the same timing as a timing at which the BAND switching control signal 15 is transmitted to the switch 7, and in addition, a cut-off frequency Fc of the first high pass filter 8 is raised for a certain period of time before DC offset drift is converged.

Thus, a time constant $\tau$ is lowered, and hence, a convergent time tiq of DC offset drift Viq, defined in accordance with the equation (6), can be shortened.

Figure 5:
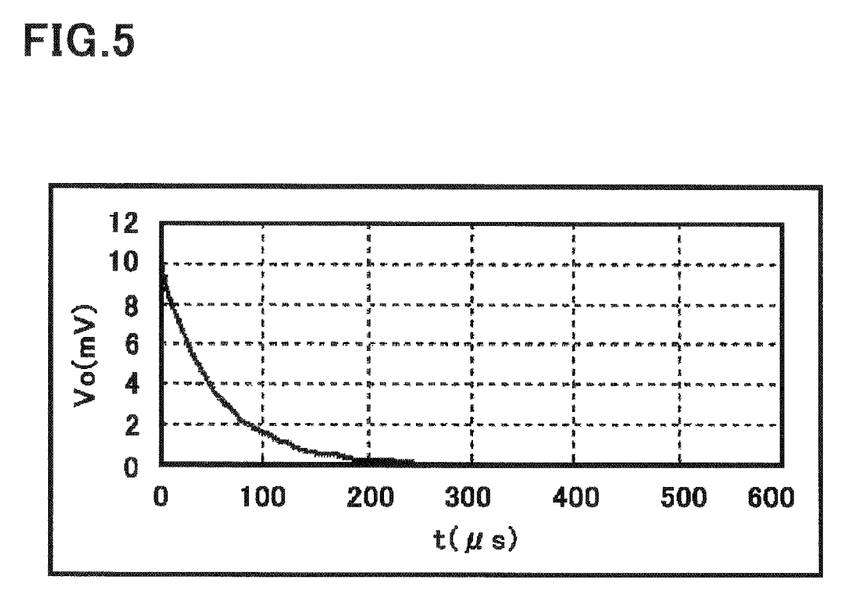
FIG. 5 shows a relation between a convergent time "t" and DC offset drift Vo output from the first high pass filter (Fc=3 KHz).
Figure 6:
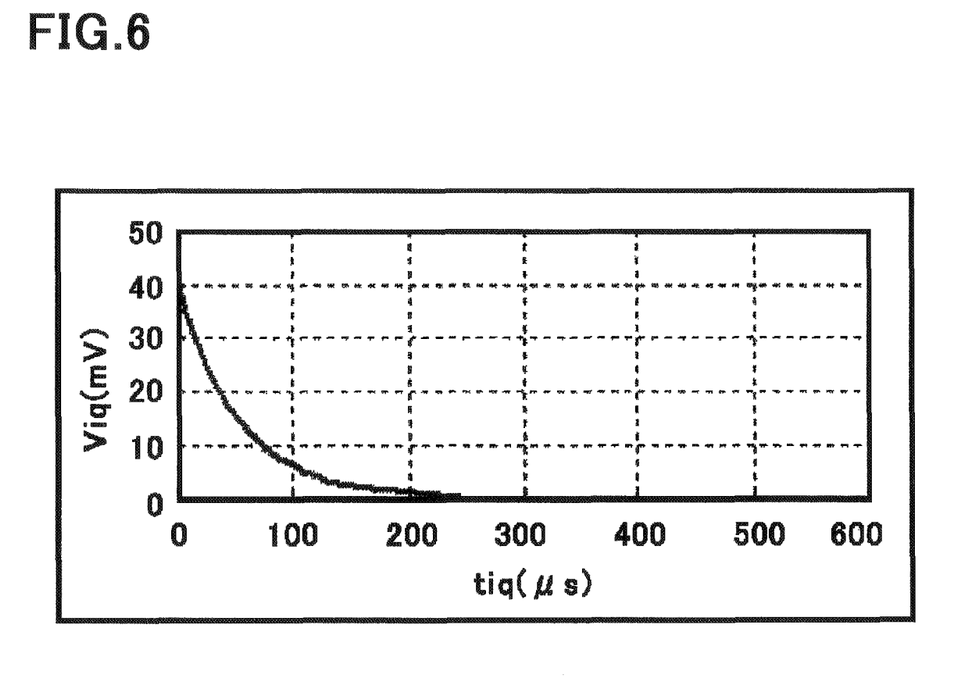
FIG. 6 shows a relation between a convergent time "tiq" of DC offset drift included in IQ output, and DC offset drift "Viq" included in IQ output (Fc=3 KHz).

As a reference example to both the relation between "t" and "$V_0$" illustrated in FIG. 3 and the relation between "tiq" and "Viq" illustrated in FIG. 4, a relation between "t" and "$V_0$" observed when a cut-off frequency Fc is raised to 3 kHz is illustrated in FIG. 5, and a relation between "tiq" and "Viq" in the same condition is illustrated in FIG. 6.

As is obvious in view of the comparison between FIGS. 3 and 5, and the comparison between FIGS. 4 and 6, a convergent time tiq of DC offset drift Viq is shortened in inverse proportion to a cut-off frequency Fc being raised (a cut-off frequency Fc in FIGS. 5 and 6 is raised twice greater than a cut-off frequency Fc in FIGS. 3 and 4).

As illustrated in FIG. 6, a convergent time tiq of DC offset drift Viq generated when a frequency band is switched to another is equal to or smaller than 250 microseconds.

Accordingly, it is possible to have a sufficient period of time for making measurement (for instance, measurement of an intensity of an electric field) in a frequency band when handover is to be carried out, ensuring correct measurement. This contributes to avoiding errors during carrying out handover.

For instance, if a transmission gap is 5 slots (for instance, assuming that 1 slot is equivalent to 667 microseconds, 5 slots are equivalent to 3335 microseconds), it is possible to have half or more of a time in a first slot.

In contrast, in FIG. 4, a convergent time tiq of DC offset drift generated when a frequency band is switched to another is about 500 microseconds, resulting in that measurement cannot be made in almost all of a time in a first slot in a transmission gap.

Examples illustrated in FIGS. 3 and 4 show cases in which a cut-off frequency Fc of the first high pass filter 8 is not raised in accordance with the HPF cut-off frequency control signal B17 when a frequency band is switched to another.

As explained so far, the multi-band receiver in accordance with the first exemplary embodiment provides advantages as follows.

(1) By raising a cut-off frequency Fc of the first high pass filter 8 in accordance with the HPF cut-off frequency control signal B17, it would be possible to shorten a convergent time tiq of DC offset drift Viq included in the IQ output 13, ensuring reduction in harmful influence exerted on signal-receiving performance of the multi-band receiver by DC offset drift Viq.

(2) By shortening a convergent time tiq of DC offset drift Viq, it is possible to have a sufficient period of time for making requisite measurements in a transmission gap, ensuring correctness in the measurements.

(3) The band switching control signal 15 is produced by selecting a certain frequency. It is possible to control a cut-off frequency of the first high pass filter 8 in synchronization with the band switching control signal 15.

(4) It is possible to arbitrarily define a convergent time tiq of DC offset drift Viq in accordance with a range in which a cut-off frequency Fc of the first high pass filter 8 varies.

(5) It is possible to shorten a convergent time tiq of DC offset drift Viq merely by raising a cut-off frequency Fc of the first high pass filter 8 even in two- or more-bands receiver after an input signal has been converted into a base band signal.

(6) The above-mentioned advantage (1) can be obtained not only when a frequency band is switched to another, but also when a frequency is switched to another. For instance, the first exemplary embodiment can be applied to switching a frequency between 2110 MHz and 2170 MHz in 2G band, or switching a frequency between 875 MHz and 885 MHz in 800M band, in which case, the BAND switching control signal 15 illustrated in FIG. 1 acts as a control signal for switching a frequency.

Second Exemplary Embodiment

Figure 7:
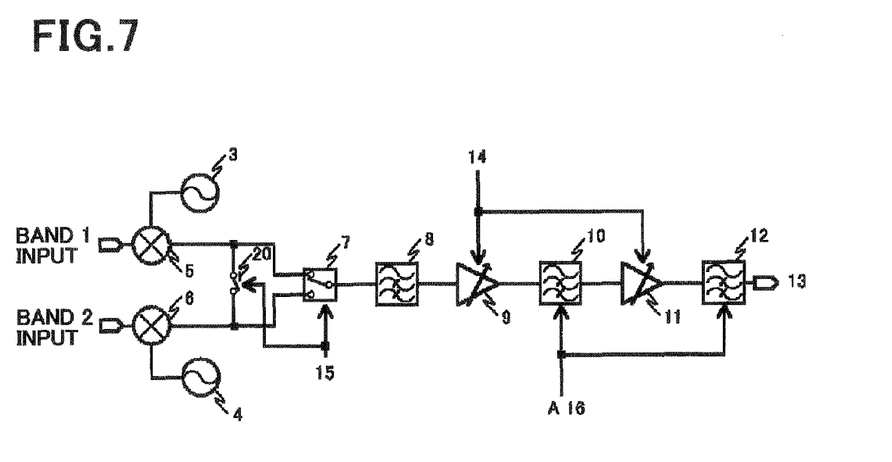
FIG. 7 is a block diagram of a multi-band receiver in accordance with the second exemplary embodiment of the present invention.

FIG. 7 is a block diagram of a multi-band receiver in accordance with the second exemplary embodiment of the present invention.

The multi-band receiver in accordance with the second exemplary embodiment is structurally different from the multi-band receiver in accordance with the first exemplary embodiment only in including a DC short-circuit switch (defined DC short-circuit means or DC short-circuit circuit in claims) disposed in parallel between an output transmitted from the BAND 1 orthogonal demodulator 5 and an output transmitted from the BAND 2 orthogonal demodulator 6, and not using the HPF cut-off frequency control signal B17. Accordingly, parts or elements that correspond to those of the multi-band receiver in accordance with the first exemplary embodiment have been provided with the same reference numerals.

The DC short-circuit switch 20 is turned on when it receives the BAND switching control signal 15 to be input when a frequency band is switched to another, and, after a certain period of time has passed, turned off.

In the multi-band receiver in accordance with the second exemplary embodiment, DC offset drift generated when one of the orthogonal demodulators 5 and 6 is switched to another for switching a frequency band are not generated by DC short-circuiting outputs transmitted from the orthogonal demodulators 5 and 6 to each other.

As explained above, in the multi-band receiver in accordance with the second exemplary embodiment, the DC short-circuit switch 20 DC short-circuits an output transmitted from the BAND 1 orthogonal demodulator 5 and an output transmitted from the BAND 2 orthogonal demodulator 6 to each other for a certain period of time when a frequency band is switched to another, ensuring that DC offset drift is prevented from being generated.

The HPF cut-off frequency control signal B17 may be used also in the multi-band receiver in accordance with the second exemplary embodiment.

EXAMPLES

As an example of the multi-band receiver in accordance with the present invention, hereinbelow is explained an example of a 3-band receiver to which the present invention is applied.

Figure 8:
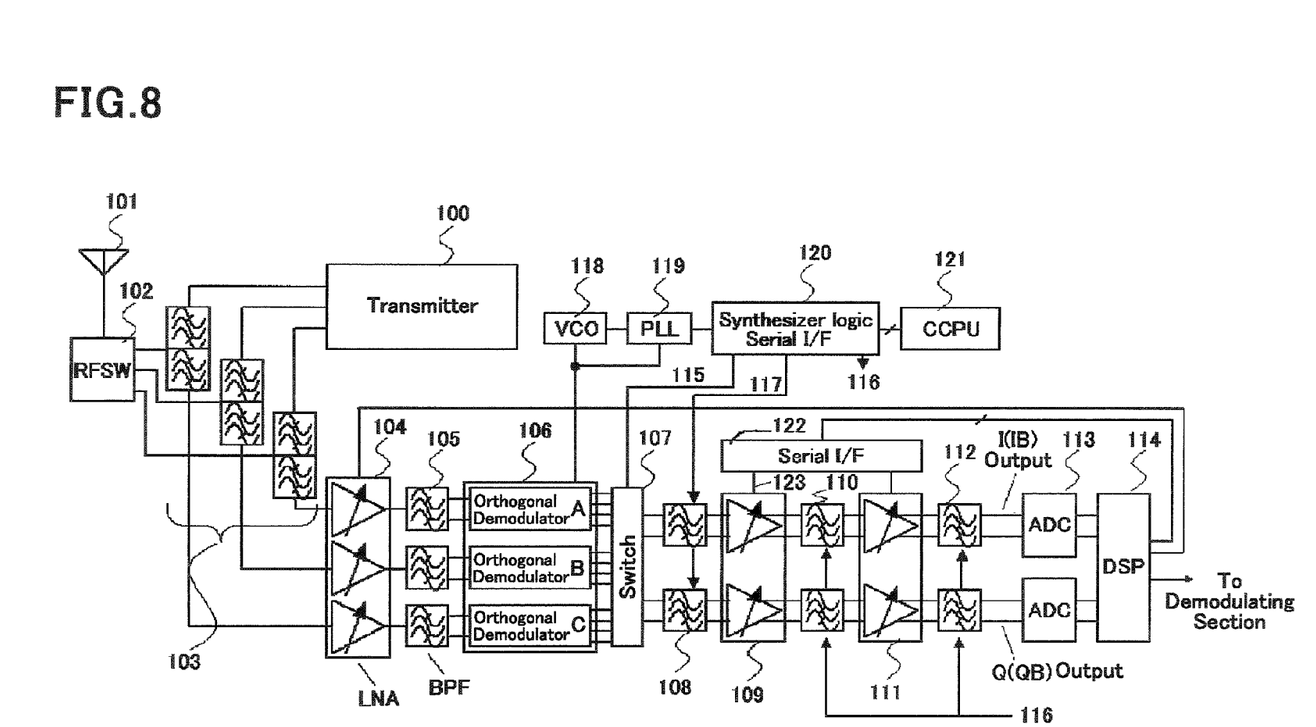
FIG. 8 is a block diagram of a 3-band receiver in accordance with the example of the present invention.

FIG. 8 is a block diagram of a multi-band receiver in accordance with an example of the present invention.

The multi-band receiver in accordance with the example is comprised of an antenna 101, a plurality of duplexers (antenna filters) 103, a switch (RFSW) 102 through which the antenna 101 and one of the duplexers 103 is electrically connected to each other, a plurality of low-noise amplifiers (LNA) 104 each electrically connected to each of the duplexers 103, a transmitter 100 electrically connected to the duplexers 103, a plurality of band pass filters (BPF) 105 each electrically connected to each of the low-noise amplifiers (LNA) 104, a first to third orthogonal demodulators 106 each electrically connected to each of the band pass filters (BPF) 105, a switch 107 which selects one of the first to third orthogonal demodulators 106, a first high pass filter 108 into which an output transmitted from an orthogonal demodulator selected by the switch 107 is input, a first AGC amplifier 109 amplifying an output transmitted from the first high pass filter 108, a second high pass filter 110 receiving an output transmitted from the first AGC amplifier 109, a second AGC amplifier 111 amplifying an output transmitted from the second high pass filter 110, a third high pass filter 112 receiving an output transmitted from the second AGC amplifier 111, an AD converter 113 which converts an analogue output transmitted from the third high pass filter 112, into a digital output, a digital signal processor (DSP) 114 which carries out base band processing to a digital signal transmitted from the AD converter 113, a CCPU 121 controlling operation of the above-mentioned parts, a synthesizer logic serial interface 120 acting as means for shortening a convergent time, a voltage controlled oscillator (VCO) 118 which transmits a BAND local signal, a phase-locked loop (PLL) 119, and a serial interface 122.

The first to third orthogonal demodulators 106 covers bands A, B and C, respectively.

The transmitter 100 transmits a transmission signal to each of the duplexers (antenna filters) 103. Each of the duplexer 103 allows a signal having a transmission frequency to pass therethrough to thereby remove unnecessary frequency part. Thereafter, the transmission signal is transmitted to the air through the switch (RFSW) 102 and the antenna 101.

Signals having been received through the antenna 101 are transmitted to duplexers 103 through the switch 102. Each of the duplexer 103 allows a signal having a receipt frequency to pass therethrough to thereby remove unnecessary frequency part.

Thereafter, the received signals are transmitted to the first to third orthogonal demodulators 106 through the low-noise amplifiers (LNA) 104 and the band pass filters 105.

The received signals are demodulated in the first to third orthogonal demodulators 106 covering frequency bands A, B and C, respectively. IQ signals transmitted from the orthogonal demodulator 106 covering a frequency band selected by the switch 107 are input into the first high pass filter 108.

Each of the I signal and the Q signal is transmitted in balanced manner in a differential mode (I and IB, Q and QB).

An output signal (analogue signal) transmitted from the first high pass filter 108 is input into the AD converter 113 through the first AGC amplifier 109, the second high pass filter 110, the second AGC amplifier 111 and the third high pass filter 112, and is converted into a digital signal in the AD converter 113.

The digital signal is transmitted to the digital signal processor (DSP) carrying out base band processing. The digital signal processor 114 transmits an output signal to a demodulating section (not illustrated).

On receipt of I and Q signals from the AD converter 113, the digital signal processor 114 transmits a control signal to the serial interface 122 in accordance with the received I and Q signals. The serial interface 122 produces an AGC control signal 123 in accordance with the received control signal, and then, transmits the AGC control signal 123 to the first AGC amplifier 109 and the second AGC amplifier 111 to thereby variably control gains of the first AGC amplifier 109 and the second AGC amplifier 111.

The voltage controlled oscillator (VCO) 118 acts as a BAND local signal oscillator. Specifically, the voltage controlled oscillator 118 transmits a clock signal as a local signal (a locally oscillated signal) to the associated orthogonal demodulator among the first to third orthogonal demodulators 106.

The synthesizer logic serial interface 120 selects a main frequency of the clock signal received from the voltage controlled oscillator 118 as a frequency for the selected frequency band.

Only one voltage controlled oscillator 118 acting as a BAND local signal oscillator is illustrated in FIG. 8 for simplification. However, as illustrated in FIG. 1, the multi-band receiver may be designed to include a plurality of voltage controlled oscillators each covering each of a plurality of frequency bands. The multi-band receiver illustrated in FIG. 8 is designed to include three voltage controlled oscillators 118 in association with three frequency bands A, B and C.

The voltage controlled oscillator 118 and the phased-lock loop (PLL) 119 cooperate with each other to define a frequency synthesizer.

The BAND switching control signal 115 and the HPF cut-off frequency control signal 117 both transmitted from the synthesizer logic serial interface 120 (means for shortening a convergent time) correspond to the BAND switching control signal 15 and the HPF cut-off frequency control signal B17 both illustrated in FIG. 1, respectively. Under the control of CCPU 121, the synthesizer logic serial interface 120 transmits the BAND switching control signal 115 and the HPF cut-off frequency control signal 117 to the switch 107 and the first high pass filter 108, respectively.

In the Example, the BAND switching control signal 115 and the HPF cut-off frequency control signal 117 are produced independently of each other. However, it should be noted that the BAND switching control signal 115 and the HPF cut-off frequency control signal 117 may be produced as a single control signal.

Under the control of CCPU 121, the synthesizer logic serial interface 120 transmits the HPF cut-off frequency control signal 116 to the second high pass filter 110 and the third high pass filter 112. The HPF cut-off frequency control signal 116 corresponds to the HPF cut-off frequency control signal A16 illustrated in FIG. 1.

In order to reduce harmful influence exerted on signal-receiving performance of the multi-band receiver by glitch noises generated when gains of the first AGC amplifier 109 and the second AGC amplifier 111 rapidly change, the second high pass filter 110 and the third high pass filter 112 raise a cut-off frequency in accordance with the HPF cut-off frequency control signal 116 received from the synthesizer logic serial interface 120, to thereby rapidly converge the glitch noises.

CCPU 121 is comprised of a central processing unit (CPU) variably controlling a local signal when a frequency band is switched to another, selecting one of outputs transmitted from the first to third orthogonal demodulators in accordance with the switch 107, variably controlling a cut-off frequency of the first high pass filter 108 when a frequency band is switched to another, variably controlling cut-off frequencies of the second high pass filter 110 and the third high pass filter 112 when gains of the first AGC amplifier 109 and the second AGC amplifier 111 vary, and carrying out communication control such as control in measuring an electric field intensity in a frequency to which handover is carried out.

In FIG. 8, the voltage controlled oscillator 118 and the phase-locked loop (PLL) 119 (for instance, comprised of a phase-frequency comparator, a charge pump, a loop filter, and so on) are illustrated as separate parts. However, it should be noted that the voltage controlled oscillator 118 may be equipped in the phase-locked loop 119.

Figure 9:
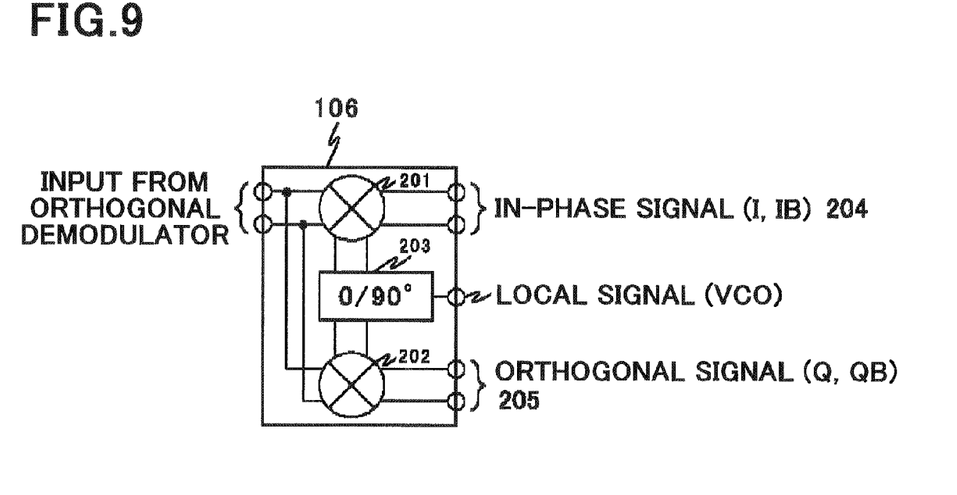
FIG. 9 is a block diagram of an example of an orthogonal demodulator.

FIG. 9 is a block diagram of the orthogonal demodulator 106 illustrated in FIG. 8.

The orthogonal demodulator 106 is comprised of a first multiplier (mixer) 201, a second multiplier 202, and a phase shifter 203 electrically connected to both of the first multiplier 201 and the second multiplier 202.

The first multiplier 201 multiplies a local signal and an output signal received from the orthogonal demodulator with each other, and outputs a product as an in-phase signal (I and IB) 204. The second multiplier 202 multiplies a local signal having a phase shifted by 90 degrees by the phase-shifter 203, and an output signal received from the orthogonal demodulator with each other, and outputs a product as an orthogonal signal (Q and QB) 205.

Figure 10:
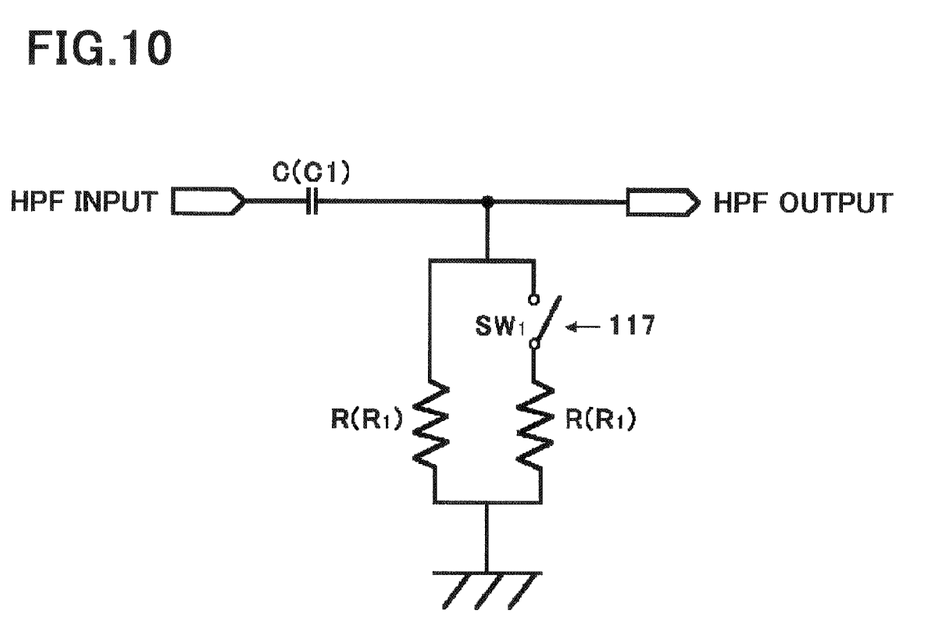
FIG. 10 is a circuit diagram of an example of the first high pass filter illustrated in FIG. 8.

FIG. 10 is a circuit diagram of an example of the high pass filter 108.

As illustrated in FIG. 10, the first high pass filter 108 is equivalent to a CR circuit comprised of a capacitor C having a capacity C1, a pair of resistors R, and a switch SW1. Each of the resistors R is electrically connected at one end thereof to the capacitor C, and grounded at the other end thereof. Each of the resistors R has a resistance R1. Furthermore, the pair of resistors R is electrically connected in parallel to each other. The switch SW1 is disposed between one of the resistors R and the capacitor C.

The switch SW1 receives the HPF cut-off frequency control signal 117. The switch SW1 is turned off when the HPF cut-off frequency control signal 117 is inactive, and the switch SW1 is turned on when the HPF cut-off frequency control signal 117 is active.

The switch SW1 is turned off when the HPF cut-off frequency control signal 117 is inactive, in which case, the first high pass filter 108 comprised of a CR circuit illustrated in FIG. 10 has a resistance equal to the resistance R1.

On the other hand, the switch SW1 is turned on when the HPF cut-off frequency control signal 117 is active, in which case, a resistance of the first high pass filter 108 is equal to R½, a time constant τ of the first high pass filter 108 is reduced to a half, and a cut-off frequency Fc of the first high pass filter 108 is doubled.

A structure of the first high pass filter 108 is not limited to a structure such as a CR circuit illustrated in FIG. 10, which variably controls a resistance defining a time constant τ in accordance with the HPF cut-off frequency control signal 117. For instance, the first high pass filter 108 may be designed to have a structure for variably controlling a capacity C1 defining a time constant τ.

The second high pass filter 110 and the third high pass filter 112 both having a cut-off frequency variably controlled in accordance with the HPF cut-off frequency control signal 116 are identical in structure with the first high pass filter 108.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

This application is based upon and claims the benefit of priority from Japanese Patent Application No. 2005-008309 filed on Jan. 14, 2005, the entire disclosure of which, including specification, claims, drawings and summary, is incorporated herein by reference in its entirety.

The invention claimed is:

1. A communication device including:
a plurality of orthogonal demodulators each covering each of a plurality of frequency bands, wherein predetermined measurement is carried out in a transmission gap period in which a part of a frame in one of said frequency bands is ceased to be transmitted, for the other among said frequency bands, and data in said transmission gap period is transmitted;
a switch which is electrically connected to outputs of the plurality of orthogonal demodulators, which switches among the outputs to select one of the outputs in accordance with a band-switching control signal, and which transmits the selected output indicating a frequency band to be used, wherein the selected output passes through the switch;
a convergent-time shortening unit for, when said one of said frequency bands is switched by the switch to said other among said frequency bands, shortening a convergent time of DC offset drift caused by switching one of said orthogonal demodulators to the other; and
a DC short-circuit unit for, when said one of said frequency bands is switched to said other among said frequency bands, DC short-circuiting an output transmitted from an orthogonal demodulator associated with said one of said frequency bands and an output transmitted from an orthogonal demodulator associated with said other among said frequency bands to each other based on said band-switching control signal for a predetermined period of time.

2. The communication device as set forth in claim 1, wherein said convergent-time shortening unit shortens said convergent time by raising a cut-off frequency of a high pass filter which receives an output transmitted from an orthogonal demodulator associated with said other among said frequency bands, when said one of said frequency bands is switched to said other among said frequency bands.

3. The communication device as set forth in claim 2, wherein said convergent-time shortening unit varies said cut-off frequency of said high pass filter within a variable range.

4. The communication device as set forth in claim 1, wherein said other among said frequency bands is a frequency band selected after handover is carried out when handover is to be carried out between different carrier frequencies.

5. The communication device as set forth in claim 1, wherein said communication device is comprised of a mobile communication device.

6. A communication device including:
a plurality of orthogonal demodulators each covering each of a plurality of frequency bands, wherein predetermined measurement is carried out in a transmission gap period in which a part of a frame in one of said frequency bands is ceased to be transmitted, for the other among said frequency bands, and data in said transmission gap period is transmitted;
a switch which is electrically connected to outputs of the plurality of orthogonal demodulators, which switches among the outputs to select one of the outputs in accordance with a band-switching control signal, and which transmits the selected output indicating a frequency band to be used, wherein the selected output passes through the switch; and
a DC short-circuit unit for, when said one of said frequency bands is switched by the switch to said other among said frequency bands, DC short-circuiting an output transmitted from an orthogonal demodulator associated with said one of said frequency bands and an output transmitted from an orthogonal demodulator associated with said other among said frequency bands to each other based on said band-switching control signal for a predetermined period of time.

7. The communication device as set forth in claim 6, wherein said other among said frequency bands is a frequency band selected after handover is carried out when handover is to be carried out between different carrier frequencies.

8. The communication device as set forth in claim 6, wherein said communication device is comprised of a mobile communication device.

9. A multi-band receiver comprising:
a plurality of orthogonal demodulators each carrying out orthogonal demodulation for each of a plurality of band inputs;
a switch which is electrically connected to outputs of said orthogonal demodulators, and selects one of the outputs transmitted from said orthogonal demodulators in accordance with a band-switching control signal, and transmits the selected output indicating a frequency band to be used, wherein the selected output passes through the switch;
a high pass filter receiving the selected output transmitted from said switch;
a variable gain-amplifying circuit disposed downstream of said high pass filter;
a convergent-time shortening unit for, when a band is switched by the switch to another, shortening a convergent time of DC offset drift caused by switching one of said orthogonal demodulators to the other; and
a DC short-circuit circuit for, when a band is switched to another, DC short-circuiting an output transmitted from the previous orthogonal demodulator and an output transmitted from a newly selected orthogonal demodulator to each other based on said band-switching control signal for a predetermined period of time.

10. The multi-band receiver as set forth in claim 9, wherein said convergent-time shortening unit shortens said convergent time by raising a cut-off frequency of said high pass filter when a band is switched to another.

11. The multi-band receiver as set forth in claim 10, wherein said convergent-time shortening unit produces said band-switching control signal in accordance with externally provided data relating to a frequency, and simultaneously produces a cut-off frequency control signal in accordance with which a cut-off frequency of said high pass filter is controlled, to thereby control a cut-off frequency of said high pass filter.

12. The multi-band receiver as set forth in claim 10, wherein said convergent-time shortening unit varies said cut-off frequency of said high pass filter within a variable range.

13. A multi-band receiver comprising:
a plurality of orthogonal demodulators each carrying out orthogonal demodulation for each of a plurality of band inputs;
a switch which is electrically connected to outputs of said orthogonal demodulators, and selects one of the outputs transmitted from said orthogonal demodulators in accordance with a band-switching control signal, and transmits the selected output indicating a frequency band to be used, wherein the selected output passes through the switch;
a high pass filter receiving the selected output transmitted from said switch;
a variable gain-amplifying circuit disposed downstream of said high pass filter;
a DC short-circuit circuit for, when a band is switched by the switch to another, DC short-circuiting an output transmitted from the previous orthogonal demodulator and an output transmitted from a newly selected orthogonal demodulator to each other based on said band-switching control signal for a predetermined period of time.

14. A receiver comprising:
a plurality of orthogonal demodulators;
a switch which is electrically connected to outputs of said orthogonal demodulators, and selects one of the outputs transmitted from said orthogonal demodulators in accordance with a band-switching control signal, and transmits the selected output indicating a frequency band to be used, wherein the selected output passes through the switch;
a high pass filter receiving the selected output transmitted from said switch;
a variable gain-amplifying circuit disposed downstream of said high pass filter;
a convergent-time shortening unit for, when a band is switched by the switch to another, shortening a convergent time of DC offset drift caused by switching one of said orthogonal demodulators to the other; and
a DC short-circuit circuit for, when a band is switched to another, DC short-circuiting an output transmitted from the previous orthogonal demodulator and an output transmitted from a newly selected orthogonal demodulator to each other based on said band-switching control signal for a predetermined period of time.

15. The receiver as set forth in claim 14, wherein said convergent-time shortening unit shortens said convergent time by raising a cut-off frequency of said high pass filter when a band is switched to another.

16. The receiver as set forth in claim 14, further comprising a DC short-circuit circuit for, when a band is switched to another, DC short-circuiting an output transmitted from the previous orthogonal demodulator and an output transmitted from a newly selected orthogonal demodulator to each other for a predetermined period of time.

17. A receiver comprising:
a plurality of orthogonal demodulators;
a switch which is electrically connected to outputs of said orthogonal demodulators, and selects one of the outputs transmitted from said orthogonal demodulators in accordance with a band-switching control signal, and transmits the selected output indicating a frequency band to be used, wherein the selected output passes through the switch;
a high pass filter receiving the selected output transmitted from said switch;
a variable gain-amplifying circuit disposed downstream of said high pass filter;
a DC short-circuit circuit for, when a band is switched by the switch to another, DC short-circuiting an output transmitted from the previous orthogonal demodulator and an output transmitted from a newly selected orthogonal demodulator to each other based on said band-switching control signal for a predetermined period of time.

18. A communication device including:
means for carrying out orthogonal demodulation for each of a plurality of frequency bands, wherein predetermined measurement is carried out in a transmission gap period in which a part of a frame in one of said frequency bands is ceased to be transmitted, for the other among said frequency bands, and data in said transmission gap period is transmitted;
a switch which is electrically connected to outputs of the plurality of orthogonal demodulators, which switches among the outputs to select one of the outputs in accordance with a band-switching control signal, and which transmits the selected output indicating a frequency band to be used, wherein the selected output passes through the switch;
means for, when said one of said frequency bands is switched by the switch to said other among said frequency bands, shortening a convergent time of DC offset drift caused by switching one of said orthogonal demodulators to the other; and
a DC short-circuit unit for, when said one of said frequency bands is switched to said other among said frequency bands, DC short-circuiting an output transmitted from an orthogonal demodulator associated with said one of said frequency bands and an output transmitted from an orthogonal demodulator associated with said other among said frequency bands to each other based on said band-switching control signal for a predetermined period of time.

19. A communication device including:
means for carrying out orthogonal demodulation for each of a plurality of frequency bands, wherein predetermined measurement is carried out in a transmission gap period in which a part of a frame in one of said frequency bands is ceased to be transmitted, for the other among said frequency bands, and data in said transmission gap period is transmitted;
a switch which is electrically connected to outputs of the plurality of orthogonal demodulators, which switches among the outputs to select one of the outputs in accordance with a band-switching control signal, and which transmits the selected output indicating a frequency band to be used, wherein the selected output passes through the switch; and
means for, when said one of said frequency bands is switched by the switch to said other among said frequency bands, DC short-circuiting an output transmitted from an orthogonal demodulator associated with said one of said frequency bands and an output transmitted from an orthogonal demodulator associated with said other among said frequency bands to each other based on said band-switching control signal for a predetermined period of time.

20. A multi-band receiver comprising:

a plurality of first means for carrying out orthogonal demodulation for each of a plurality of band inputs;

switch means for being electrically connected to outputs of said first means, and selecting one of the outputs transmitted from said first means in accordance with a band-switching control signal, and transmitting the selected output indicating a frequency band to be used, wherein the selected output passes through the switch;

high pass filtering means receiving the selected output transmitted from said switch means;

variably gain-amplifying means disposed downstream of said high pass filtering means;

means for, when a band is switched by the switch to another, shortening a convergent time of DC offset drift caused by switching one of said first means to the other; and a DC short-circuit means for, when a band is switched to another, DC short-circuiting an output transmitted from the previous orthogonal demodulator and an output transmitted from a newly selected orthogonal demodulator to each other based on said band-switching control signal for a predetermined period of time.

21. A multi-band receiver comprising:

a plurality of first means for carrying out orthogonal demodulation for each of a plurality of band inputs;

switch means for being electrically connected to outputs of said first means, and selecting one of the outputs transmitted from said first means in accordance with a band-switching control signal, and transmitting the selected output indicating a frequency band to be used, wherein the selected output passes through the switch;

high pass filtering means for receiving the selected output transmitted from said switch means;

variably gain-amplifying means disposed downstream of said high pass filtering means; and DC short-circuit means for, when a band is switched by the switch to another, DC short-circuiting an output transmitted from the previous first means and an output transmitted from a newly selected first means to each other based on said band-switching control signal for a predetermined period of time.

22. A receiver comprising:

a plurality of first means for carrying out orthogonal demodulation;

switch means for being electrically connected to outputs of said first means, and selecting one of the outputs transmitted from said first means in accordance with a band-switching control signal, and transmitting the selected output indicating a frequency band to be used, wherein the selected output passes through the switch;

high pass filtering means for receiving the selected output transmitted from said switch means;

variably gain-amplifying means disposed downstream of said high pass filtering means;

means for, when a band is switched by the switch to another, shortening a convergent time of DC offset drift caused by switching one of said first means to the other; and a DC short-circuit means for, when a band is switched to another, DC short-circuiting an output transmitted from the previous orthogonal demodulator and an output transmitted from a newly selected orthogonal demodulator to each other based on said band-switching control signal for a predetermined period of time.

23. A receiver comprising:

a plurality of first means for carrying out orthogonal demodulation;

switch means for being electrically connected to outputs of said first means, and selecting one of the outputs transmitted from said first means in accordance with a band-switching control signal, and transmitting the selected output indicating a frequency band to be used, wherein the selected output passes through the switch;

high pass filtering means receiving the selected output transmitted from said switch means;

variably gain-amplifying means disposed downstream of said high pass filtering means; and means for, when a band is switched by the switch to another, DC short-circuiting an output transmitted from the previous orthogonal demodulator and an output transmitted from a newly selected orthogonal demodulator to each other based on said band-switching control signal for a predetermined period of time.

* * * * *